UNITED STATES PATENT OFFICE.

HUGH BURGESS, OF ROYER'S FORD, PENNSYLVANIA.

IMPROVEMENT IN COMPOUNDS FOR PURIFYING WATER, PREVENTING CORROSION, &c.

Specification forming part of Letters Patent No. 149,097, dated March 31, 1874; application filed March 20, 1874.

*To all whom it may concern:*

Be it known that I, HUGH BURGESS, of Royer's Ford, Montgomery county, Pennsylvania, have invented a new and useful method of purifying the water and preventing corrosion and the formation of scale in boilers; and I do hereby declare the following to be a full, clear, and precise description thereof, which will enable those skilled in the art to which it appertains to make and use the same.

The object of my invention is the production of a new article of manufacture in the form of an anti-incrustating liquid for the purifying of the water and the removal of rust and scale from boilers by chemical action, unaided by mechanical means.

I have invented a compound for purifying water and preventing the corrosion and incrustation of boilers by digesting or by boiling wood and other similar vegetable substances in a solution of either caustic or carbonated alkali, or in a mixture of caustic and carbonated alkali combined.

The following mode I prefer for making this anti-incrustator liquid: I take a convenient quantity of the vegetable substance, such as sawdust or any waste or other vegetable material, and boil it, under pressure, (I prefer about sixty pounds,) in a solution of caustic alkali, in which the real alkali contained in the solution is in the proportion of one part to three of the vegetable matter. The strength of the resulting solution will depend on the quantity of absolute alkali to the gallon of the alkaline solution, and, therefore, for a very strong anti-incrustating liquid, I use a solution of caustic alkali of about 15° Baumé, or weaker in proportion to the strength of the anti-incrustating liquid required.

In certain cases, it is desirable that the anti-incrustating liquid should contain a certain quantity of carbonated alkali. In this case the necessary amount of this carbonated alkali can be introduced into the caustic-alkaline solution of the vegetable matter; or the vegetable matter may be boiled in a mixture of caustic or carbonated alkali, or in carbonated alkali alone. I have found that the greater the proportion of soluble vegetable matter which the liquid anti-incrustator contains the better it answers the desired purpose of acting as an anti-incrustating agent for steam or other boilers. I therefore prefer not to evaporate the vegetable alkaline solution, prepared as above, to dryness, or to a pasty state, for the market, since I have found that a considerable portion of the vegetable matter is thrown out of solution after it has been evaporated to about 30° Baumé. This precipitated vegetable matter is not rendered soluble by the addition of any quantity of water; and there is, moreover, a liability of some of the vegetable matter being charred during the latter stages of evaporation, thus producing a floating, light, insoluble material, which, when introduced into the boiler, is liable to float and be carried over by the steam into the steam-pipe, and thence into steam machinery, which, in some cases, may entail serious injury.

Having thus fully described my invention, and the various methods of its preparations, what I claim, and desire to secure by Letters Patent of the United States, is—

A new article of manufacture—an anti-incrustating liquid for the purifying of water and prevention of corrosion and the formation of scale in boilers, made by boiling, under pressure, wood and other vegetable substances in a solution of caustic or carbonated alkali, either alone or mixed in any proportion.

HUGH BURGESS.

Witnesses:
ADAM EVERLY,
WILLIAM PARENT.